United States Patent Office 3,421,705
Patented Jan. 14, 1969

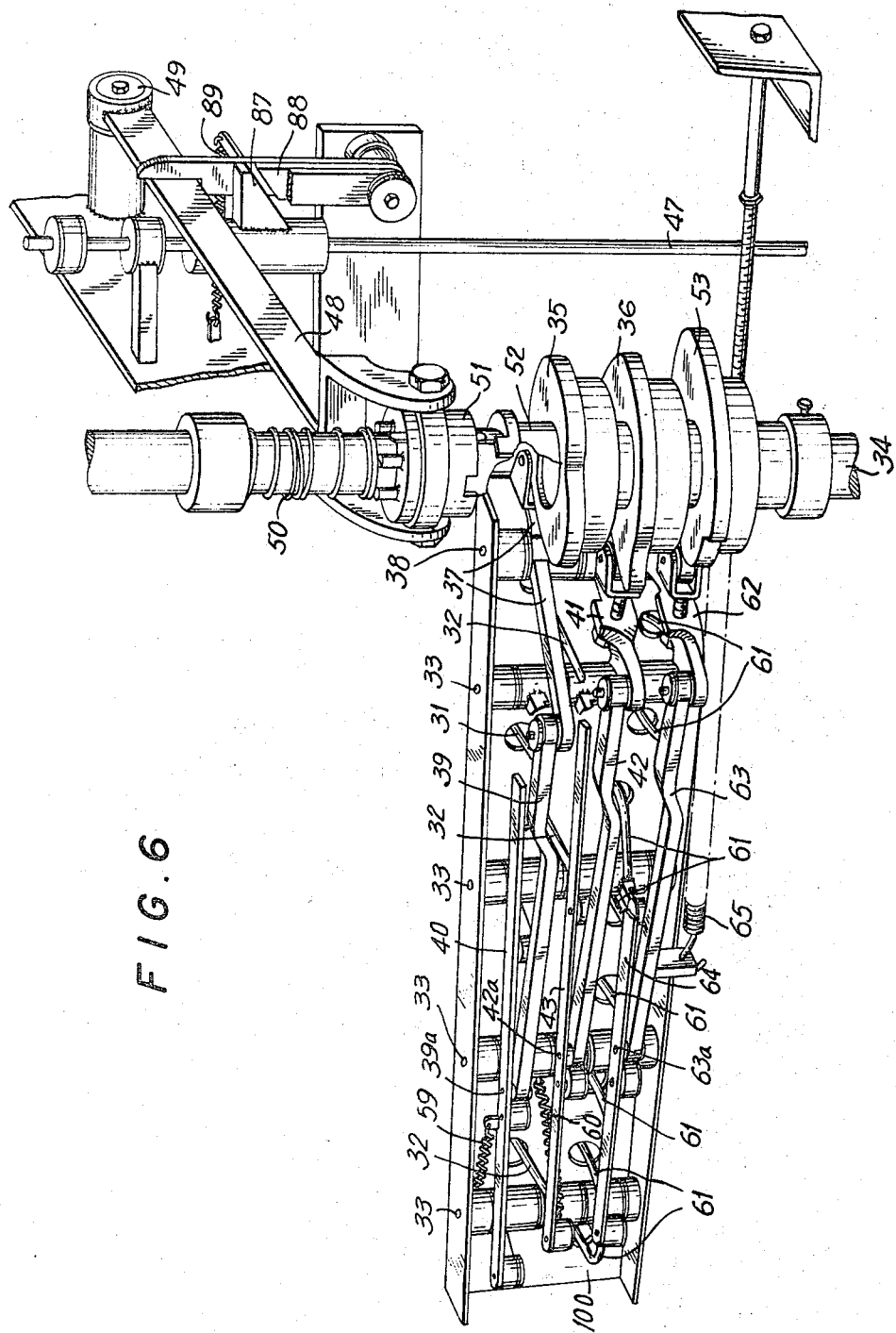

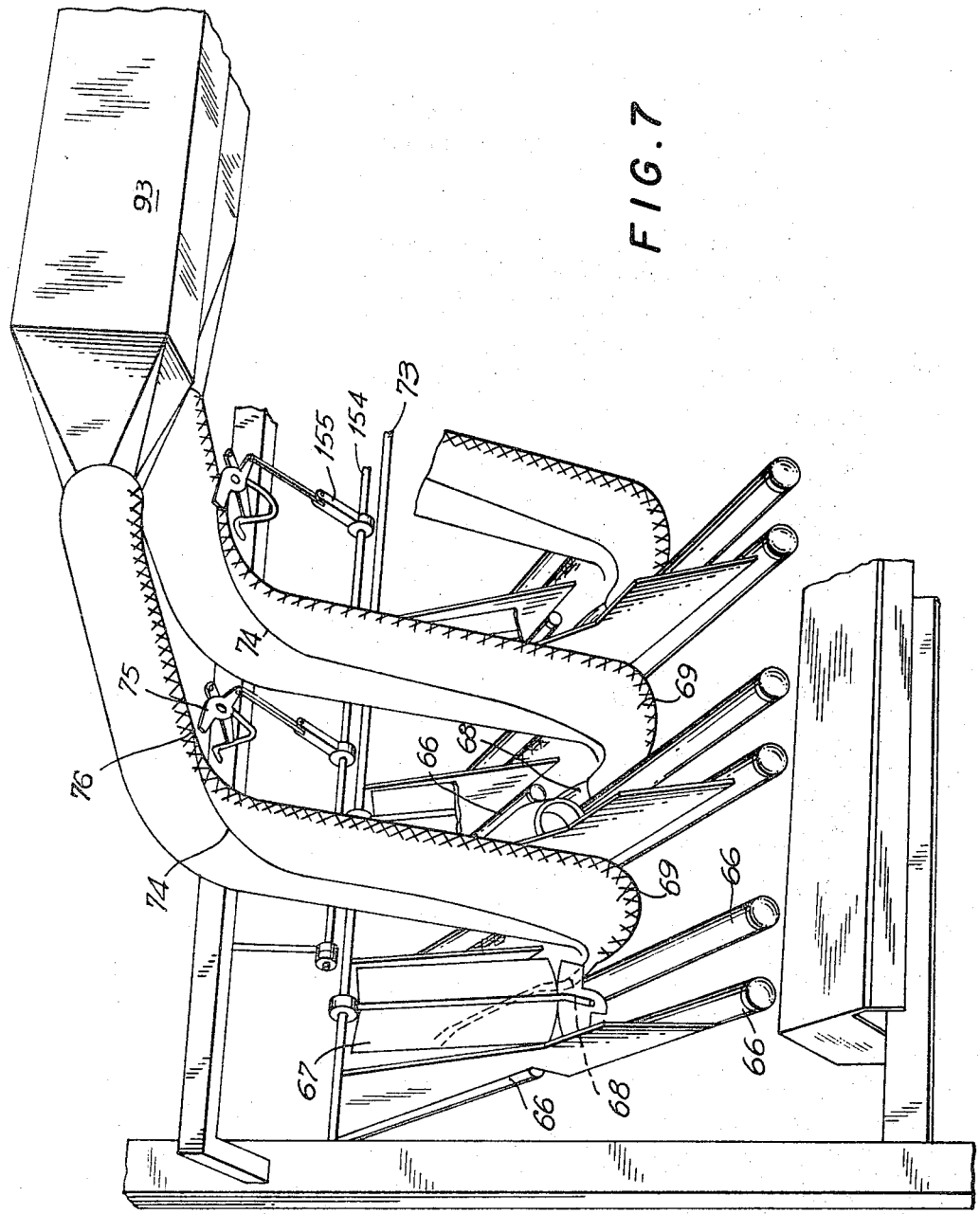

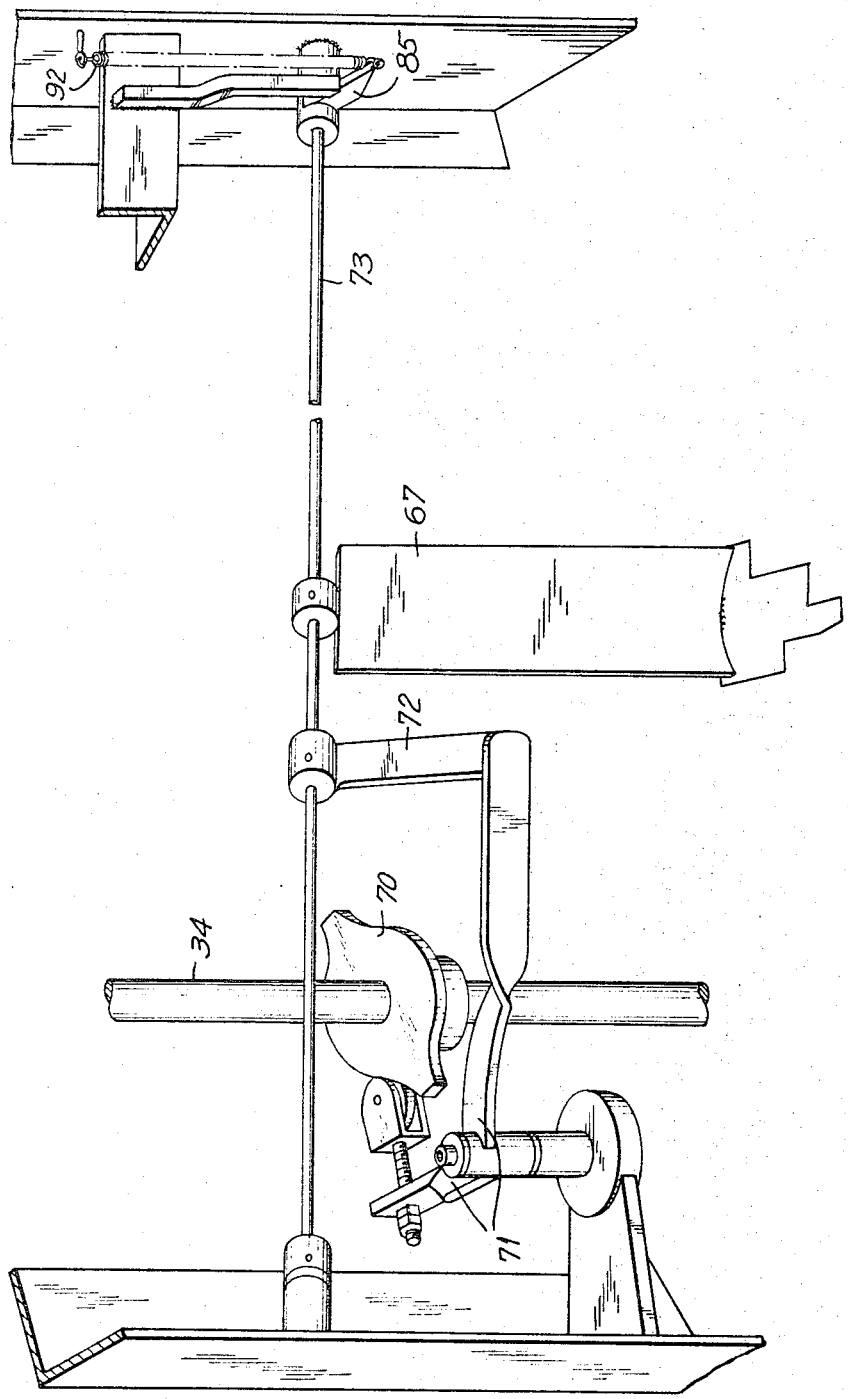

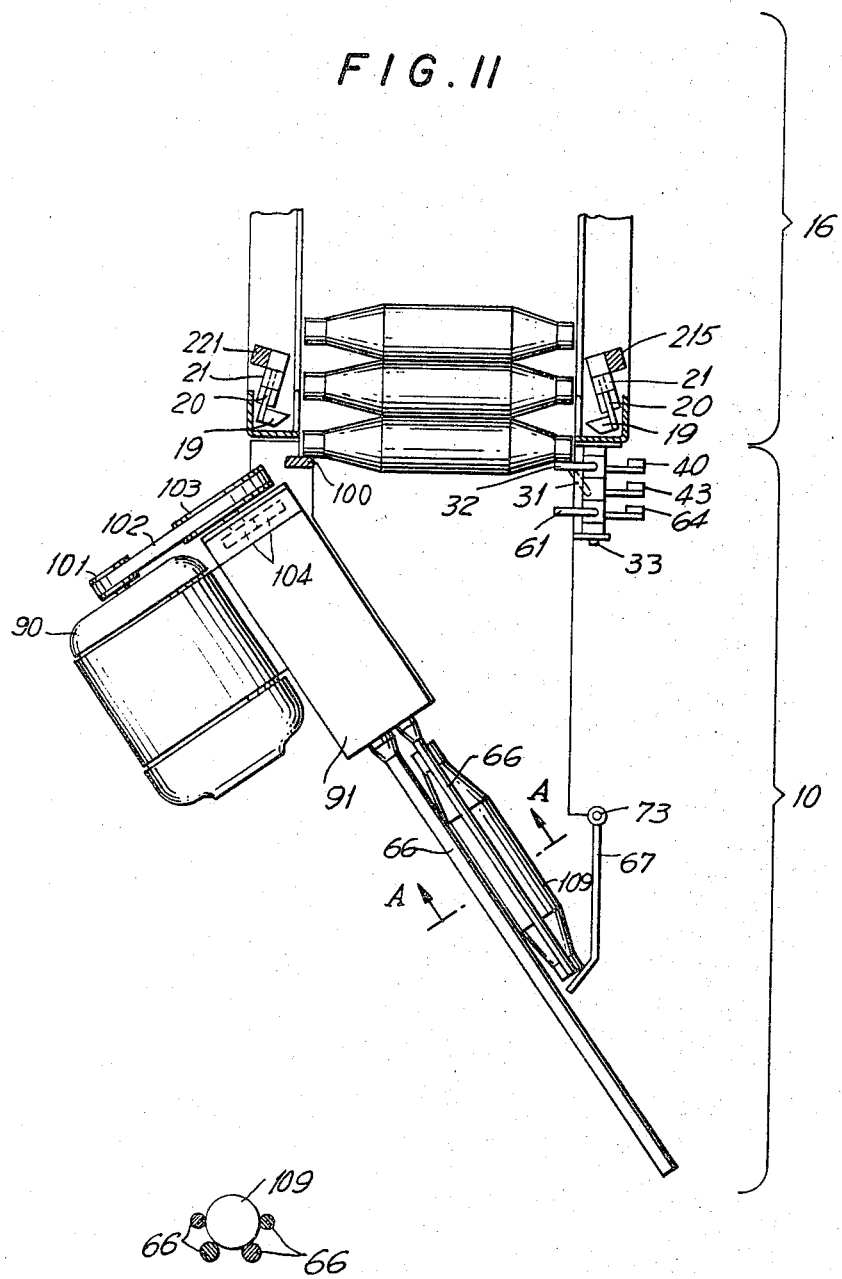

3,421,705
MACHINE FOR THE CONTINUOUS MANUFAC-
TURE OR HANDLING OF YARN COPS
Jànos Benedict, Almelo, Netherlands, assignor to
Koninklijke Textielfabrieken, Nijverdal-Ten Cate
N.V., Almelo, Netherlands
Filed June 11, 1965, Ser. No. 463,303
Claims priority, application Netherlands, June 19, 1964,
6407033
U.S. Cl. 242—35.5            15 Claims
Int. Cl. B65h 54/00

ABSTRACT OF THE DISCLOSURE

An automatic yarn cop handling mechanism in which stacked cops are released in succession onto an array of rotatable shafts such that the cops rotate with the shafts and unwind a free end of yarn which is drawn into a suction tube of a transferring device.

---

The present invention relates to a device for application in a machine for the continuous manufacture or handling of yarn cops, said device being provided with a container for containing a number of cops to be supplied thereto in a stack-wise fashion and also with at least one automatically operated mechanism for releasing separately one cop in the same position.

The object of the invention is to make the production process as economical as possible. Because of labor shortage it is desirable to mechanize the presentation of yarn cops to further manufacturing or handling machines of the cops in such a way, that said machine can handle the yarn of said cops without the intervention of manual labor. For the supply of yarn cops the following operations are necessary: Picking up a cop, looking for the lowermost free end of the yarn, to breaking off said end as closely to the yarn body as possible, looking for the topmost free end of the yarn and unwinding said yarn several turns, positioning the cops in a holder and positioning the topmost free end of the yarn in a clamping means and breaking off the superfluous yarn, or arranging the topmost free end of the yarn in front of a suction opening and sucking in said free end.

The full cops, usually, are thrown in random position into a basket or a similar container. In practice the supply of cops which are orientated in boxes can be made automatically as mentioned above, said boxes comprising a number of parallel shafts in which the cops are arranged stack-wise.

The device according to the invention is characterized by at least two parallel shafts under the releasing mechanism, having the same orientation as the cops for supporting the cops, said shafts being continuously rotatable about their longitudinal axes in order to cause the rotation about its longitudinal axis of a cop supported by said shafts at the place of a removable abutment for the cop, said abutment extending between the shafts, a transferring device being positioned in front of the abutment between the shafts and having an opening in a suction tube, in such a way that a small length of the free end of the yarn is unwound from the rotating cop and is drawn away by the suction tube, said supporting shafts also serving for the supply of the cops to the following manufacturing or handling machine.

Said machine can comprise a mechanism for rewinding the yarn of the cops into yarn packages which are arranged along one or more sides of the machine, said machine being provided with a knotting device which can be moved along said sides in a mechanical way as is used for knotting together a free end of each of said already wound packages and the free yarn end of each of the cops handled by the supplying device and presented in a yarn clamping means of the machine.

The device combined with such a rewinding machine according to the invention is characterized in that the knotting device is coupled to a cop supply device, the supporting shafts for the cops of which lead to a cop holder of the winding machine and the suction tube of the transferring device leads to a yarn clamping means of the winding machine in order to transfer the free end of the cop which has been unwound somewhat to the yarn clamping means and to a mechanism for removing the free yarn end.

In the automatic supply of yarn cops according to the present invention the treating of yarn cops on the spinning machine is effected by the arrangement wherein the bottom end of the yarn is broken off closely to the yarn body, so that the bottom end of the yarn cannot be intermingled with the top end during the removal of the full cops from the spinning machine. Thereby it is possible in the automatic supply of cops according to the present invention to find the topmost free end of the yarn by a simple suction operation and to present it at the necessary place for the winding machine.

In the drawing an embodiment of the machine according to the invention is illustrated by way of example. Said machine has fixed winding stations at either side of the winding machine.

FIGURE 6 is a diagrammatic side view of the cops supply hooks with the corresponding moving mechanisms of the automatic cop supply mechanism of the present invention.

FIGURE 7 is a side view of the suction station of the automatic cop supply mechanism.

FIGURE 8 is side view showing the means for controlling movement of the trap doors of the automatic cop supply mechanism.

FIG. 11 is a section showing the container and the cop supply mechanism therebeneath.

FIG. 11A is a section taken on lines A—A in FIG. 11.

Figure 1:
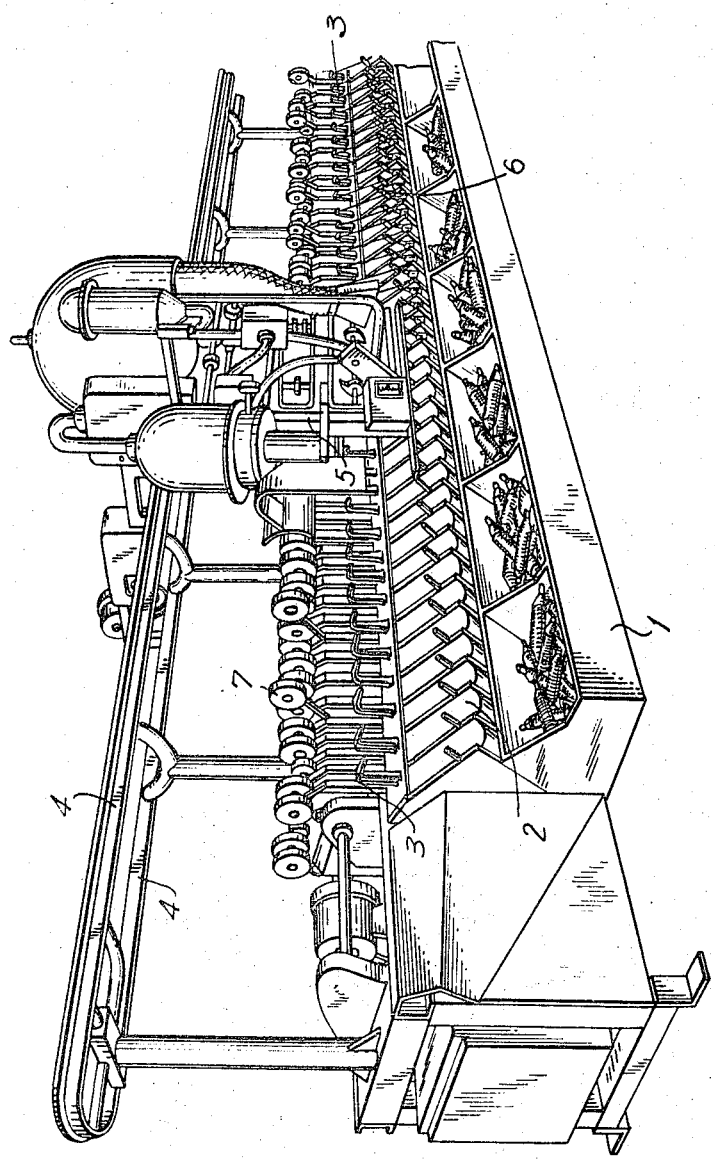
FIGURE 1 is a perspective view of a conventional winding machine without an automatic cop supply mechanism.
Figure 2:
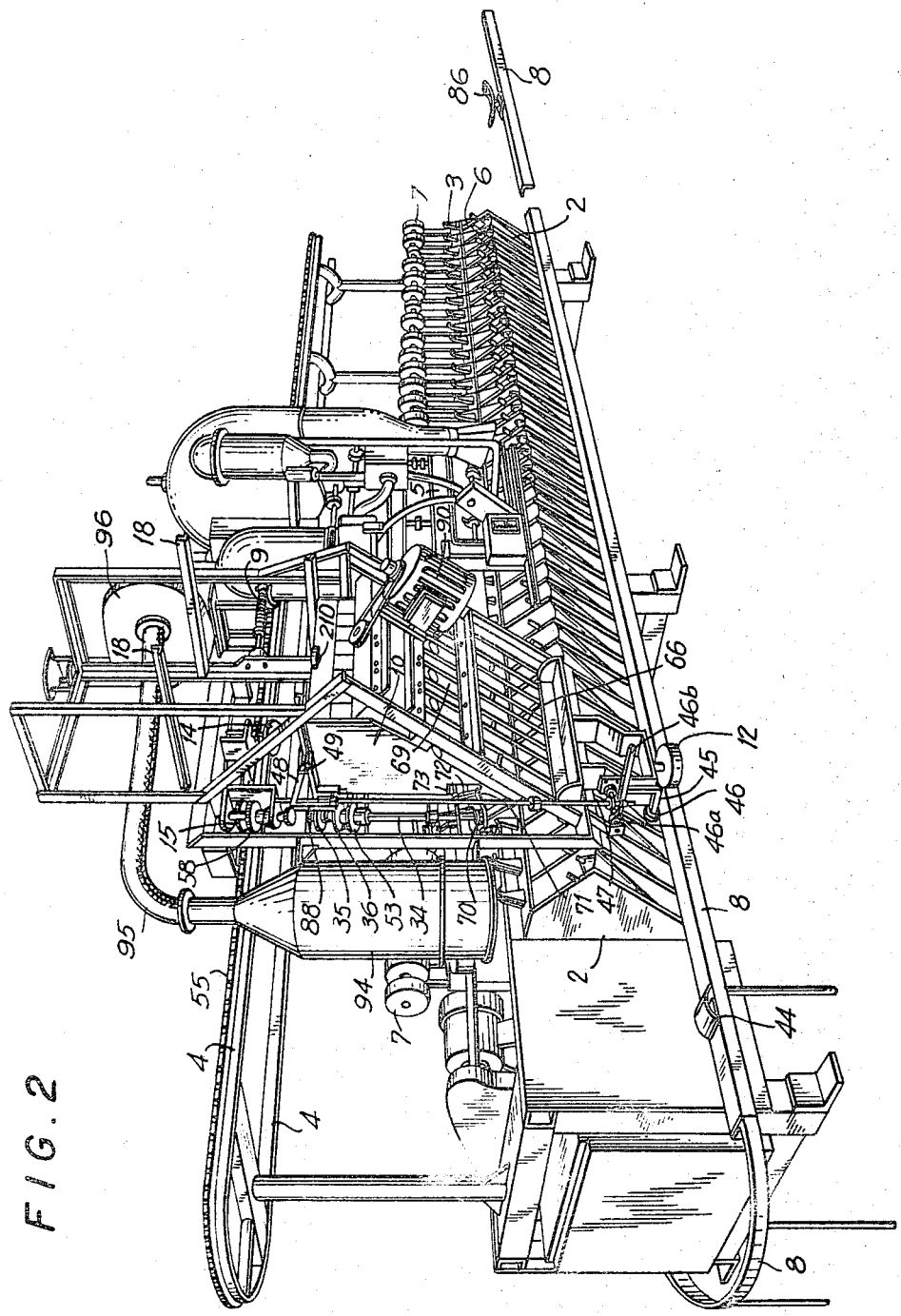
FIGURE 2 shows the same machine with a mechanism for automatic cop supply according to the invention.

In FIGURE 1 the cops to be presented to the winding machine lie in boxes 1. Without an automatic cop supply mechanism, the operating personnel must take a cop from the box 1 by hand, must remove the bottom free end of the yarn, must look for the topmost end of the yarn and must unwind said end somewhat, must position the cop into the cop holder 2, must clamp the unwound yarn end into the clamping means 3 and must break off the yarn just above the clamping means 3. An automatic knotting device 5 moves along the rails 4 of the winding machine and along the winding stations and brings the cops from the holder 2 in a winding position further in the machine and knots the free end 6 of the yarn presented in the clamping means to the free end of the already wound yarn body 7, which has been traced in the meantime. The tubes finished off during the foregoing cycle are discharged through an endless belt positioned in the machine. The knotting device 5 runs around the machine and returns after the unwinding of a cop to the winding station, after which the whole operation is repeated. In FIGURE 2 there is shown in the machine an endless rail 8 in replacement of boxes 1. The knotting device 5 draws with a constant velocity the automatic cop supply mechanism 10 by means of a hook 9. The cop supply mechanism 10 (see also FIGURE 3) is supported on the rails 4 of the winding machine by two wheels 11 and by one wheel 12 on the rail 8. The two guiding wheels 13, the guiding wheels 14 and the gear wheels 15 insure that the automatic cop supply mechanism moves along the winding stations in a path which is formed by the rails 4.

Figure 4:
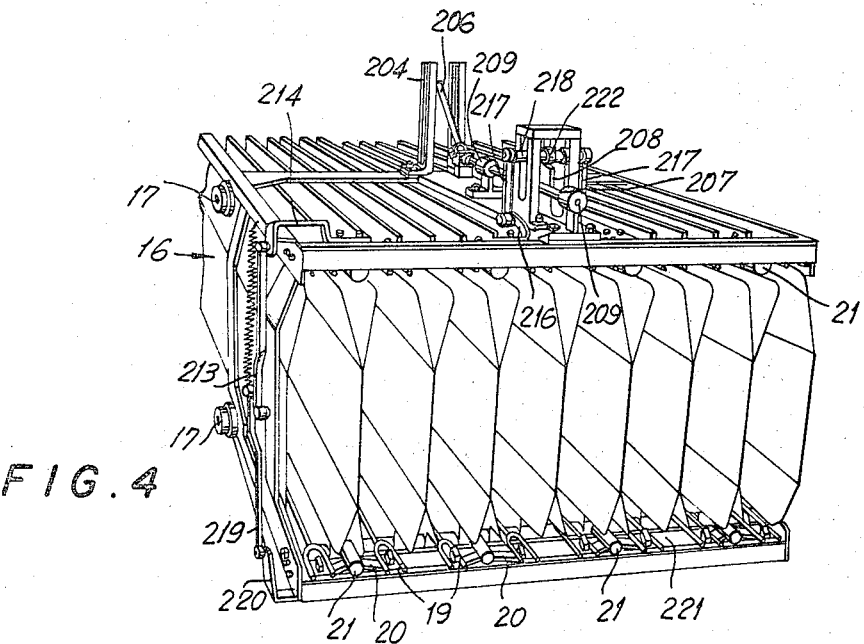
FIGURES 4 and 5 are diagrammatical bottom and side views of the container in which the cops are supplied.
Figure 5:
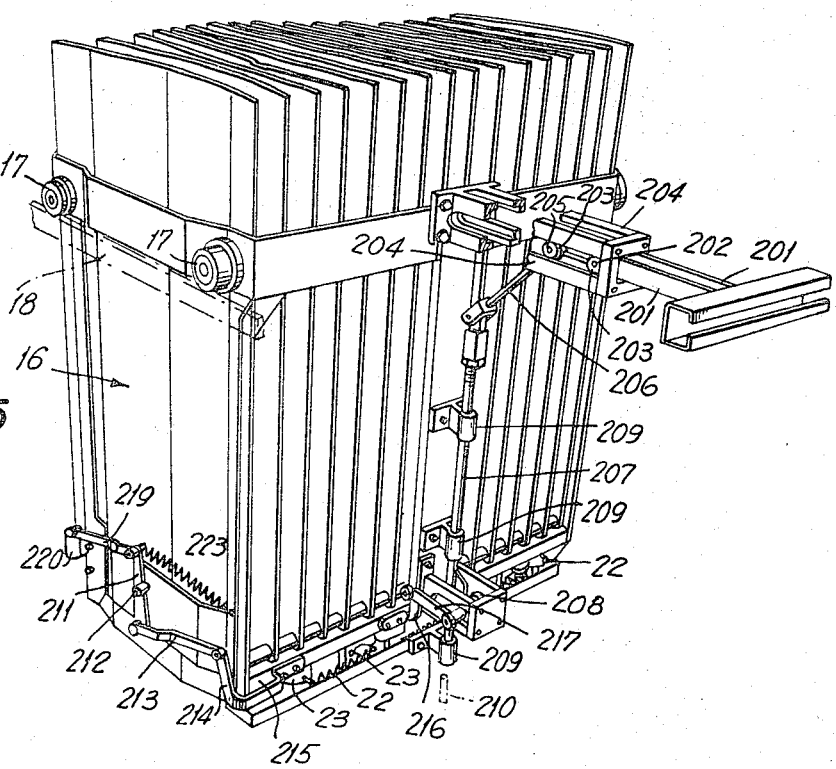
Figure 10:
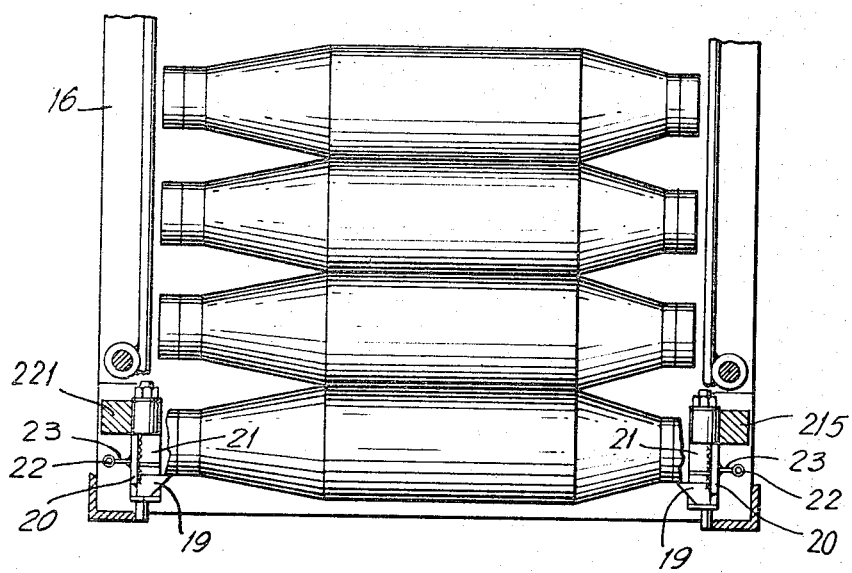
FIG. 10 is a section through the container showing the cops retained by the cams.

At the end of the winding machine a container 16 (see FIGURES 4 and 5) is moved with its foremost wheel 17 over the rails 18 into the top portion of the automatic cop supply mechanism. The container 16 comprises eight shafts or compartments in which there are cops. The lowermost cops in each shaft rest at both their ends on cams 19 which are pivotably connected to shafts 21 by means of plates 20. The cams 19 are urged to a position in shaft 16 in which they support the cops under the action of springs 22 acting on pins 23 (see FIG. 10).

Figure 4A:
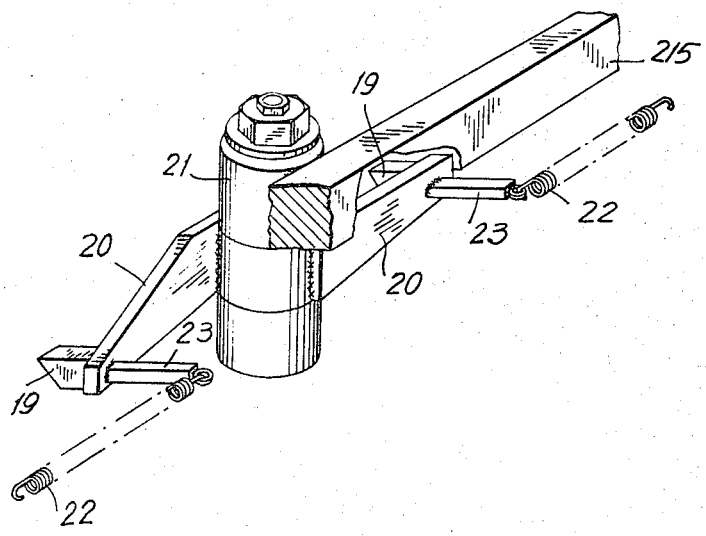
FIGURE 4A is an enlarged view of a cam control mechanism of the supply container.

The container 16 is filled with cops from the bottom side. The cams 19 are pressed to the outside by the movement of a cop from the bottom to the top, because said cams have an incline face (see FIG. 4A). As soon as the tube of the cop passes over the cams 19, said cams retract and block the passageway, so that the cops cannot drop from the shafts.

When the container 16 is moved completely into the automatic cop supply mechanism, rods 201 are pressed towards the container. Said rods 201 are attached to shafts 202 and 205, which are guided in the openings of plates 204 by means of roller bearings 203. A rod 206 is connected to the shaft 205 and presses down a rod 207 with its cam 208. The rod 207 can slide in sleeves 209 attached to the frame of the container. Now, if the rod 207 descends, it is inserted into a sleeve 210 of the automatic cop supply mechanism, so that said container is locked. If the rod 207 descends still more, a cam 208 is shifted from underneath roller bearing 222 and a spring 223 rotates through a lever 211, which itself is rotatable about a shaft 212, by pulling rod 213, lever 214, and a square rod 215. The square rod 215 is connected through two levers 216, two pulling rods 217 and a shaft 218 to the roller bearing 222. The spring 223 also rotates by the action of pulling rod 219, lever 220, and square rod 221, positioned at the other side of the container 16.

The shafts 21 are attached to the square rods 215 and 221. Upon rotation of the square rods 215 and 221 the cams 19 connected to the shafts 21 by means of the plates 20 are removed from the path of the cops, so that a horizontally supported cop can drop unimpeded from each compartment of the container 16. A total of eight cops will simultaneously drop from the container as eight compartments have been illustrated. The cops drop with their topmost ends on an abutment 100 (see FIGURES 3 and 11) and with their bottom ends on four hooks 31 and four hooks 32 (see FIGURES 6 and 11). Said hooks are rotatably connected on four shafts 33 in a channel member and are operated from a cam shaft 34 having two cams 35 and 36. The cam 35 operates the four hooks 31 via the lever 37, which is rotatable about a shaft 38, and via the rod 39, transverse shaft 39a, and connecting rod 40. The cam 36 operates the four hooks 32 via lever 41, which is rotatable about the shaft 38, and via rod 42 transverse shaft 42a, and connecting rod 43.

Figure 3:
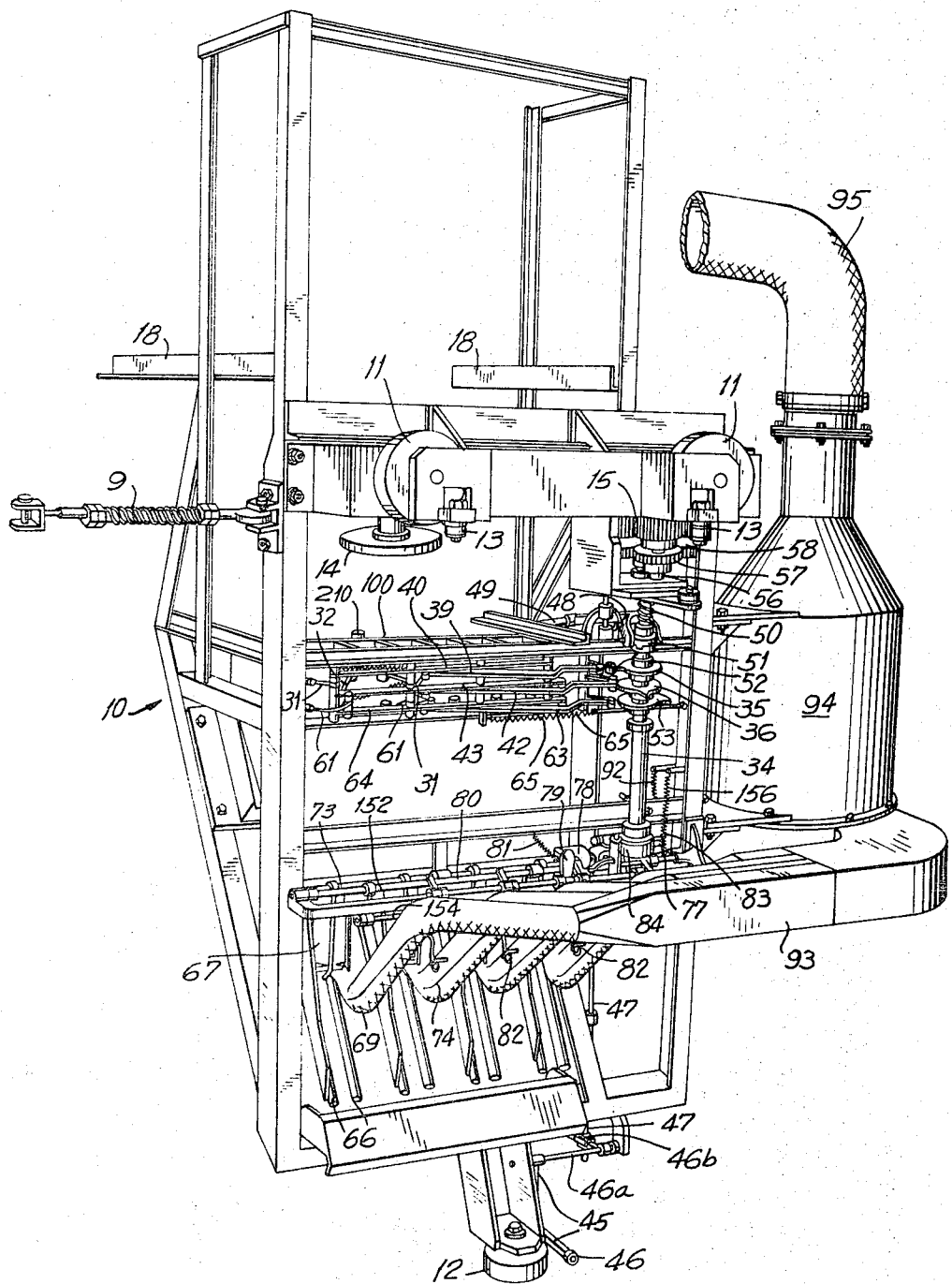
FIGURE 3 is an elevation view of the automatic cop supply mechanism of the present invention.

When the knotting device again starts running and draws the automatic cop supply mechanism with it, then said device arrives at a spot of the rail 8 where an elevation 44 presses against the wheel 46 connected to the lever 45 (see FIGURE 3).

The lever 45 causes the rotation of the shafts 46a and the lever 46b attached thereto, pulls down the rod 47, so that also the lever 48 which is rotatable about the shaft 49, is pulled down. The helical spring 50 positioned about the cam shaft 34 then is able to press down a pinion 51 provided with a key way, so that a fixed connection is provided between said cam shaft 34 and the sleeve 52 rotatable thereon and on which the three cams 35, 36 and 53 are mounted.

The gear 15 is moved by the tooth rack 55 which is provided on the rails 4 of the winding machine. The gear 15 is attached to the shaft 56 onto which also a gear 57 is provided. The gear 57 cooperates with the gear 58 of the cam shaft 34, so that when the automatic cop supply mechanism moves along the winding machine, the cam shaft is rotated.

The cam 36 presses against the lever 41 and via the rod 42, the four hooks 32 are pulled out of the path of the cops lying on the hooks 32 by the force of the spring 16 (see FIG. 6), said cops still lying with their heads on the abutment 100. Then the cops descend until they are restrained by the right hand portion of four double hooks 61. The cam 36 releases the hooks 32 again, so that the spring 60 again retracts the hooks, and the cops, lying on top of the lowermost cops, now supported by the hooks 61, are blocked.

When the cam shaft continues its rotation, a portion of the cam 53, having a larger radius, presses against the lever 62, which is rotatable about the shaft 38, whereby through the rod 63 and through the transverse shaft 63a, the connecting rod 64, and the double hooks 61 are rotated against the force of the spring 65 in such a way that the left hand portion rotates towards the inside and the right hand portion rotates towards the outside. Because of the fast that the right hand portions of the double hooks 61 turn outwardly, four of the eight cops drop in the four suction positions, in each of which a cop is collected by four inclined rotatable shafts 66 and a trap door 67 (see FIGURES 3, 7, 11 and 11A). The sixteen rotating shafts 66 are driven by the motor 90 through the gear box 91 (see FIGURE 2). By the fact that every cop in its suction position is enclosed between four rotating shafts, it starts rotating itself, so that the free end of the yarn is sucked away and unwound by a suction opening 68 placed parallel to the shafts and at the end of the suction tube 69. If sufficient yarn has been unwound and the automatic cop supply mechanism is positioned in front of the four corresponding cop holders 2 of the winding machine, then the lever 71 is pressed against the lever 72, which is attached to the shaft 73 by one of the two cams of the cam shaft 34 (FIGURE 8), so that said shaft 73 is rotated and the trap doors attached to said shaft 73, are opened.

When the trap doors 67 open, the cops which are present in the suction station slide over the two lowermost shafts 66 into the cops holders 2 of the winding machine.

Figure 9:
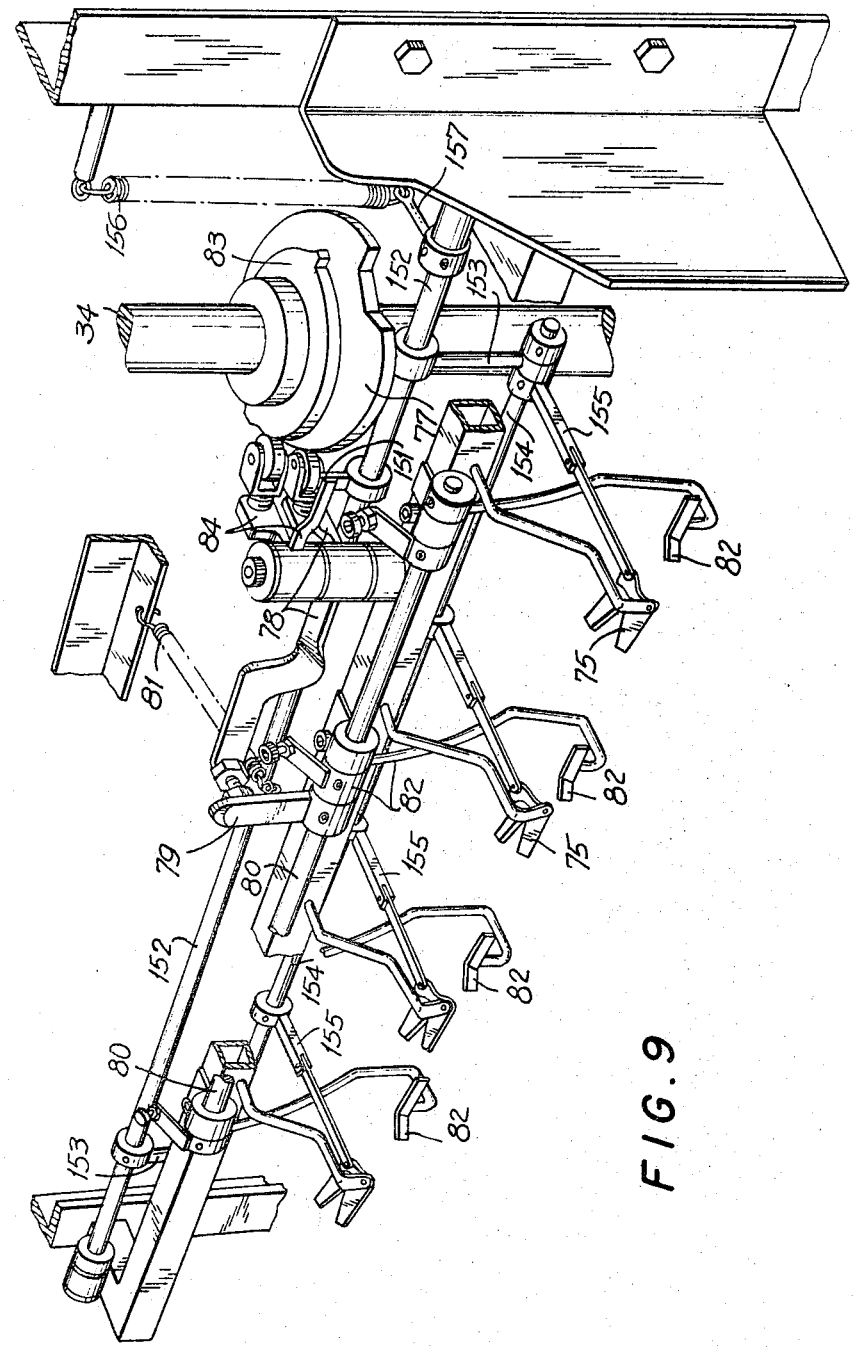
FIGURE 9 is a side view of the drive for a scissors and opener members of the yarn clamping means of the automatic cop supply mechanism.
Figure 12:
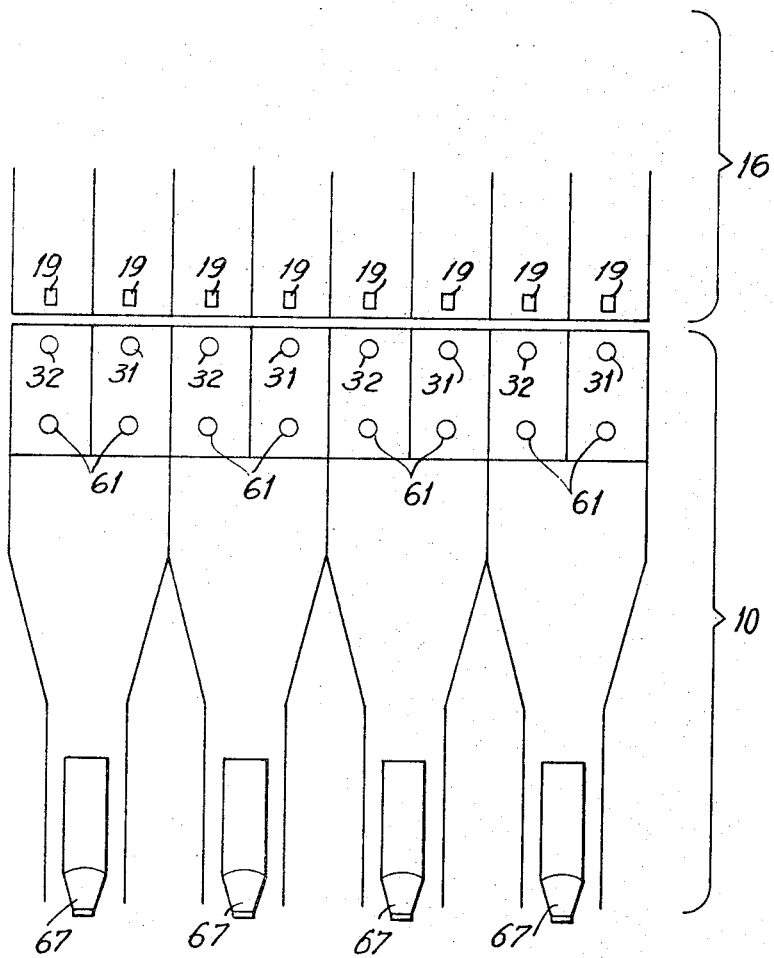
FIG. 12 is a longitudinal section through the cop container and cop supply mechanism indicating the general operation thereof.

The free end of the yarn which has been unwound a little, is drawn by the suction of the air along an air-slit 74, which is connected to the lowermost edge of the longitudinal suction opening 68 of the suction tube 69 and which ascends along said tube, to the finish 76 of said slit above the scissors 75. The piece of yarn tensioned between the cop in the cop holder 2 and the terminal 76 of the slit 74 is in a path in which also the yarn clamping means 3 of the winding machine are provided. If the automatic cop supply mechanism is moved again, the lever 78 is rotated by the cam 77 (FIGURE 9), so that said shaft 80 is freed through the lever 79 attached to the shaft 80 and the spring 81 can rotate the shaft 80. The opening means 82 for the yarn clamping means attached to the shaft 80 move forwardly and opens the yarn clamping means of the winding machine, the yarns advance into the clamping means and said clamping means close, because they are released by the opening means 82.

Now, one of the two cams 83 presses against the lever 84, said lever 84 pressing the lever 151 away, so that the shaft 152 is rotated. The two levers 153 attached to the shaft 152 press the shaft 154 to the front, so that the four scissors 75 are closed by the four connecting links 155 and the yarn is cut. When the cam 83 has released again the lever 84, then the spring 156 opens the scissors 75 through the lever 157, the shaft 152, the two levers 153, the shaft 154 and the four links 155. The cut yarn end is sucked away through the suction tubes. These cams 77 retract the four opening means 82 and the cam 70 (FIGURE 8) releases the shaft 73, so that the spring 92 turns back the shaft through the lever 85 and closes the trap doors 67.

In the meantime the cam 35 (FIGURE 6) has retracted the four hooks 31 and released the same, the spring 59 having retracted same inwardly, so that the cops lying above the lowermost cop, are blocked.

After the trap doors 67 have been closed, the portion having the larger radius of the cam 53 is rotated from under the lever 62, so that the spring 65 rotates the double hooks 61 in such a way that their right hand portion rotates inwardly and their left hand portion rotates outwardly. Hereby the cops lying on the left hand portions are released and drop in the suction stations. Here the yarn end is sucked again and is unwound somewhat, after which the cops drop into the cop holders of the winding machine and the yarn ends are laced into the yarn clamping means of the winding machine in a way described before.

The double hooks 61 release one at a turn a cop from one of the two guiding means lying thereover, said guiding means corresponding to the eight shafts of the container 16. The guiding means of the cops underneath the double hooks is made in such a way that the cops drop from the two guiding means of a double hook in the suction position lying under the center of the double hook.

At the end of the machine the operation of the automatic cop supply mechanism must be switched off, because at that end there are no cop holders 2. This is obtained by means of a guide 86 over the rail 8, said guide starting to press against the wheel 46 attached to the lever 45. Said lever 45 presses through a shaft 46a and the lever 46b the rod 47 in an upward position. Said rod presses the lever 48 in an upward position, so that the pinion 51 is lifted and the sleeve 52 comprising the three cams 35, 36 and 53 is declutched and does not rotate with the shaft 34 anymore. The last cops slide from the suction stations into the cop holders, no new cops coming into the suction stations.

The lever 48 is kept in its uppermost position by the fact that it is supported by the lever 88, which is pressed against the lever 48 by the spring 89.

As the automatic cop supply mechanism advances through the curve at the end of the machine and approaches the cop holders again, the wheel 46 again meets an elevation 44, so that the rod 47 presses with its cam 87 against the inclination of the lever 88. The lever 88 is pressed from under the lever 48 by the spring 89, so that the supply of the cops through the suction station is started again. When all the cops from the container 16 are conveyed into the cop holders, then the hook on the mechanism is declutched by means of the member 86, so that an empty container 16 can be exchanged by a full one. Thereafter the described cycle is repeated.

The air drawn away by the suction tubes is guided to the sieve box 94 through passages 93. In the said sieve box 94, the cut off yarn ends are collected against the sieve. The air continues its way through the flexible tube or hose 95 to the fan 96 attached to the knotting device 5 of the winding machine. At one end of the machine, the air stream above the sieve is interrupted by the closure of a valve. Then the bottom of the sieve box is opened so that the yarn ends collected therein can drop out. The sieve box is closed again and the air valve is reopened so that the automatic cop supply mechanism can proceed with its operations.

The draw hook 9 by means of which the knotting device draws the automatic cop supply mechanism, is provided with a spring.

Figure 13:
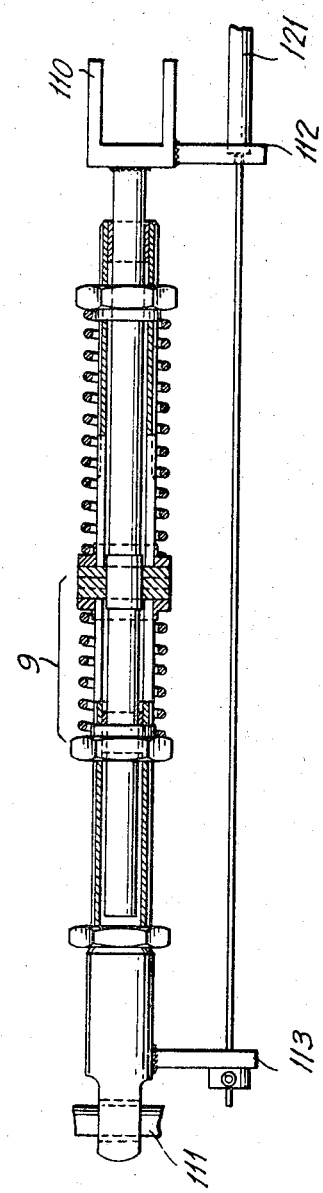
FIG. 13 is a sectional view showing a Bowden cable in a resilient coupling between the knotting device and the cops supply container.
Figure 14:
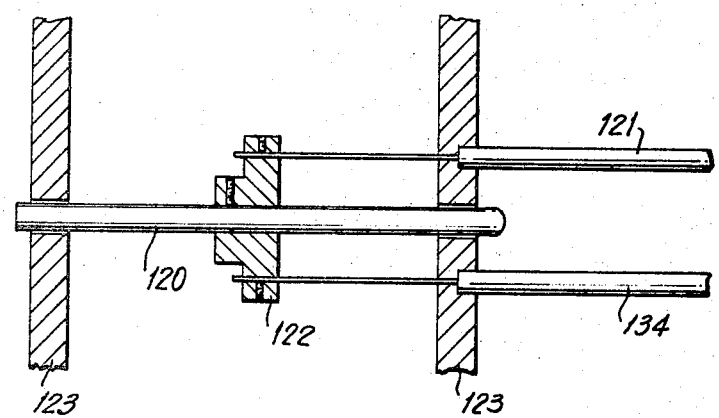
FIG. 14 is a sectional view which shows the operation of a brake of the knotting device by the Bowden cable.

If said spring is extended too much then the brake of the drive of the knotting device which is connected to the spring by means of a Bowden cable, is actuated and the drive is switched off. If the path of the automatic cop supply mechanism is blocked in one way or another then said mechanism is stopped automatically. Thus as seen in FIGS. 13 and 14, the resilient draw hook 9 is connected to the knotting device by means of a fork 110 and to the cops supply mechanism 10 by means of the fork 111. If the hook is pulled out too much, e.g. because the movement of the automatic supply mechanism is blocked, then the inner cable of the Bowden cable 121 is pulled out by the point of attachment 113 relative to the outer cable which rests against the plate 112.

In FIGURE 14, the pin 120 is incorporated in a braking system of the knotting device.

If said pin 120 is moved to the right then the brake is put into operation in a known way. If the hook 9 is tensioned too much and the Bowden cable is activated, then the inner cable sheave 122 is pulled to the right, so that the pin 120 activates the brake. The outer cable rests against the frame 123 of the knotting device.

The brake of the knotting device is also actuated when the cops sliding from the suction stations are held back by the trap doors 67 and are not positioned in the cop holders 2. Also in that case the brake is operated by means of a sensing pawl through another Bowden cable.

Figure 15:
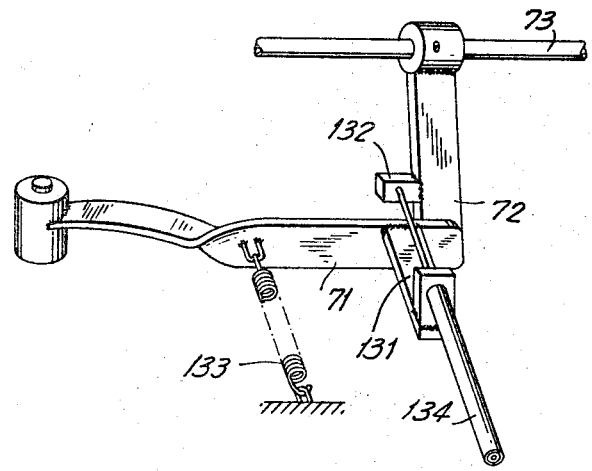
FIG. 15 is a perspective view showing the operation of a Bowden cable by blockage of the trap doors.

FIGURE 15 shows in detail the operational portion of the axle 73 of the trapdoors 67 of FIGURE 8. Under normal action the spring 42 retracts the trapdoors into the position of rest, so that the lever 72 remains pressed against the lever 71.

If, however, the return movement of the trapdoors 67 is hindered by a cop, then the lever 71 is retracted by the spring 133 into the position of rest, but the lever 72 cannot follow the lever 71. The lever 72 is provided with a strip 132 to which the inner cable of the Bowden cable 134 is attached. The lever 77 is provided with a strip 131 against which the outer cable of the Bowden cable 134 rests. Thus the Bowden cable is activated by the disturbance mentioned above, said Bowden cable activating the sheave 122 in the same manner as the cable 121 and therefore activating the brake of the knotting device.

What is claimed is:

1. A machine for the continuous handling of yarn cops comprising a container for storing a number of cops in stacked arrangement, said container traveling lengthwise of the machine, at least one automatically operated releasing mechanism for separately releasing one of the cops in the same position as it was stacked, at least two parallel shafts under each releasing mechanism for receiving and supporting a corresponding cop released therefrom, means for continuously rotating said shafts to cause the cop supported thereby to undergo rotation about its longitudinal axis, said shafts being inclined with the vertical to support the cops in tilted position, a removable abutment extending between said shafts to hold the cop thereon, a suction tube positioned adjacent each said abutment and having a suction opening for drawing thereinto a small length of the free end of the yarn which is unwound from the rotating cop, means for rewinding yarns from the cops onto yarn packages arranged along the machine, means for knotting the free end of the yarn from a cop with a free end of the yarn from a package, and means for releasing the cops from the supporting shafts by removal of the abutments from between respective shafts.

2. A machine as claimed in claim 1, wherein said knotting means is driven and said container travels with the knotting means, the machine further comprising yarn clamping means adjacent said suction tube for engaging free end of yarn, and copy holders for receiving cops released from said supporting shafts.

3. A machine according to claim 2 wherein the means for releasing the yarn cops from the container comprises cams arranged under the cops, spring means urging said cams in the path of the overlying yarn cops, means for overcoming the spring means to urge the cams out of said path of the cops such that the lowermost cop is released and the remaining cops can move downwardly in the container and a retaining mechanism beneath the release mechanism for holding the released cops.

4. A machine according to claim 3 wherein the retaining mechanism comprises an abutment and rotatable retaining hooks, cams for rotating said hooks, a rotatable cam shaft supporting said cams, second retaining hooks positioned beneath the first hooks, a further cam on said cam shaft for acting on said second hooks such that the latter support the cops released by the retaining hooks, and clutch means for interrupting rotation of the cam shaft at predetermined positions along the machine.

5. A machine according to claim 4 comprising a driving means for the cam shaft comprising a gear transmission including a gear cooperating with a tooth rack mounted along the periphery of the machine, so that when the container advances with the knotting device the gear is operated and the cam shaft is rotated.

6. A machine according to claim 5 wherein the container includes a plurality of cop guides, said retaining hooks being double-acting, such that they alternately let cops drop from two cop guides.

7. A machine according to claim 4 comprising a rail member mounted at the periphery of the machine, abutments on said rail member which engage and disengage the clutch means upon arrival of the container at places in the machine where it is desirable or not to supply cops.

8. A machine according to claim 7 comprising coupling means between the knotting device and the container including flexible means and means for halting the knotting means if the movement of the container is blocked.

9. A machine according to claim 1 wherein said parallel shafts are four in number, said shafts being inclined and mounted pair-wise above each other, the topmost pair of shafts having a larger spacing than the lower pair of shafts, said lower pair of shafts having a spacing which is smaller than the diameter of an empty tube of the cop.

10. A machine according to claim 9 wherein said abutment comprises a pivotable trap door between said four parallel shafts for the release of the cops.

11. A machine according to claim 10 wherein at least some of said shafts are sufficiently long to form sliding means for the cops after same have been released by the trap door.

12. A machine according to claim 11 wherein said suction opening is adjacent said shafts for drawing away the yarn end from the rotating cop, and means for moving said trap door out of the path of the cop after a predetermined number of revolutions of the shafts.

13. A machine according to claim 12 wherein each of the suction tubes is provided with a slit for guiding the yarn end.

14. A machine according to claim 13 comprising yarn clamping means adjacent said suction tube, means including opening members for opening said clamping means by the movement of the container such that the yarn ends are brought into the clamping means after which said clamping means are closed.

15. A machine according to claim 14 comprising a scissor like means having a driving motion such that after the insertion of each yarn end into the yarn clamping means the yarn end freely projecting out of the clamping means is cut off and is drawn away into the suction tube.

References Cited

UNITED STATES PATENTS

| | | | |
|---|---|---|---|
| 2,350,927 | 6/1944 | Reiners et al. | 242—35.5 |
| 3,111,280 | 11/1963 | Reiners et al. | 242—35.5 |
| 3,121,540 | 2/1964 | Furst | 242—35.5 |
| 3,168,257 | 2/1965 | Perry | 242—35.5 |
| 3,217,235 | 11/1965 | Kieronski. | |
| 3,279,710 | 10/1966 | Raasch | 242—35.5 |

STANLEY N. GILREATH, *Primary Examiner.*

U.S. Cl. X.R.

242—35.6